US012706103B2

(12) United States Patent
Eriksson

(10) Patent No.: US 12,706,103 B2
(45) Date of Patent: *Aug. 11, 2026

(54) COMFORT NOISE GENERATION

(71) Applicant: TELEFONAKTIEBOLAGET LM ERICSSON (PUBL), Stockholm (SE)

(72) Inventor: Anders K. Eriksson, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 28 days.

This patent is subject to a terminal disclaimer.

(21) Appl. No.: 18/378,063

(22) Filed: Oct. 9, 2023

(65) Prior Publication Data

US 2024/0185866 A1 Jun. 6, 2024

Related U.S. Application Data

(63) Continuation of application No. 17/864,060, filed on Jul. 13, 2022, now Pat. No. 11,817,109, which is a continuation of application No. 17/109,267, filed on Dec. 2, 2020, now Pat. No. 11,423,915, which is a continuation of application No. 15/118,720, filed as application No. PCT/SE2014/050179 on Feb. 14, 2014, now Pat. No. 10,861,470.

(51) Int. Cl.

| | |
|---|---|
| ***G10L 19/012*** | (2013.01) |
| ***G10L 19/008*** | (2013.01) |
| ***G10L 19/03*** | (2013.01) |
| ***G10L 25/03*** | (2013.01) |

(52) U.S. Cl.

CPC .......... *G10L 19/012* (2013.01); *G10L 19/008* (2013.01); *G10L 19/03* (2013.01); *G10L 25/03* (2013.01)

(58) Field of Classification Search

CPC ..... G10L 19/012; G10L 19/008; G10L 19/03; G10L 25/03

USPC .......................................................... 704/200.1

See application file for complete search history.

(56) References Cited

U.S. PATENT DOCUMENTS

| | | | | |
|---|---|---|---|---|
| 10,861,470 | B2 | 12/2020 | Eriksson | |
| 11,423,915 | B2 * | 8/2022 | Eriksson | G10L 19/03 |
| 11,817,109 | B2 * | 11/2023 | Eriksson | G10L 19/03 |
| 2007/0055398 | A1 | 3/2007 | Steinberg | |
| 2008/0004870 | A1 | 1/2008 | Liu et al. | |
| 2011/0070926 | A1 | 3/2011 | Vitte et al. | |
| 2013/0006622 | A1 | 1/2013 | Khalil et al. | |
| 2013/0034243 | A1 | 2/2013 | Yermeche et al. | |

(Continued)

FOREIGN PATENT DOCUMENTS

| | | | |
|---|---|---|---|
| WO | 200145870 | A2 | 6/2001 |
| WO | 2008021247 | A2 | 2/2008 |

OTHER PUBLICATIONS

International Search Report and Written Opinion dated May 2, 2014, in International Application No. PCT/SE2014/050179, 14 pages.

(Continued)

*Primary Examiner* — Thierry L Pham

(74) *Attorney, Agent, or Firm* — ROTHWELL, FIGG, ERNST & MANBECK, P.C.

(57) ABSTRACT

Apparatuses, arrangements and methods therein for generation of comfort noise are disclosed. In short, the solution relates to exploiting the spatial coherence of multiple input audio channels in order to generate high quality multi channel comfort noise.

9 Claims, 6 Drawing Sheets

(56) References Cited

U.S. PATENT DOCUMENTS

| | | | | |
|---|---|---|---|---|
| 2016/0027447 | A1 | 1/2016 | Dickins et al. | |
| 2016/0125867 | A1* | 5/2016 | Jarvinen | G10K 11/17857 381/73.1 |

OTHER PUBLICATIONS

Peter Eneroth et al: "A Real-Time Implementation of a Stereophonic Acoustic Echo Canceler", IEEE Transactions on Speech and Audio Processing, IEEE Service Center, New York, NY, US, vol. 9, No. 5, Jul. 1, 2001 (Jul. 1, 2001), XP011054111, ISSN: 1063-6676, pp. 513-523.

Benyassine A et al: "ITU-T Recommendation G.729 Annex B: A Silence Compression Scheme for Use With G.729 Optimized for V.70 Digital Simultaneous Voice and Data Applications", IEEE Communications Magazine, IEEE Service Center, Piscataway, US, vol. 35, No. 9, Sep. 1, 1997 (Sep. 1, 1997), pp. 64-73, XP000704425, ISSN: 0163-6804, DOI: 10.1109/35.620527.

Extended European Search Repon dated Aug. 7, 2017, issued in European Patent Appiicatiorl No. 17176159.6, 5 pages.

Indian Examination Report dated Jul. 23, 2019, issued in Indian Patent Application No. 201617026236, along with English translation, 7 pages.

* cited by examiner

COMFORT NOISE GENERATION

CROSS REFERENCE TO RELATED APPLICATION(S)

This application is a continuation of U.S. application Ser. No. 17/864,060, filed Jul. 13, 2022, which is a Continuation of Ser. No. 17/109,267, filed Dec. 2, 2020, (now U.S. Pat. No. 11,423,915), which is a Continuation of Ser. No. 15/118,720, filed Aug. 12, 2016, (now U.S. Pat. No. 10,861,470), which is a 35 U.S.C. § 371 National Phase Entry Application from PCT/SE2014/050179, filed Feb. 14, 2014, designating the United States. The disclosures of each of the referenced applications are incorporated herein in their entirety by reference.

TECHNICAL FIELD

The solution described herein relates generally to audio signal processing, and in particular to generation of comfort noise.

BACKGROUND

Comfort noise, CN, is used by speech processing products to replicate the background noise with an artificially generated signal. This may for instance be used in residual echo control in echo cancellers using a non-linear processor, NLP, where the NLP blocks the echo contaminated signal, and inserts CN in order to not introduce a perceptually annoying spectrum and level mismatch of the transmitted signal. Another application of CN is in speech coding in the context of silence suppression or discontinuous transmission, DTX, where, in order to save bandwidth, the transmitter only sends a highly compressed representation of the spectral characteristics of the background noise and the background noise is reproduced as a CN in the receiver.

Since the true background noise is present in periods when the NLP or DTX/silence suppression is not active, the CN has to match this background noise as faithfully as possible. The spectral matching is achieved with e.g. producing the CN as a spectrally shaped pseudo noise signal. The CN is most commonly generated using a spectral weighting filter and a driving pseudo noise signal. This can either be performed in the time domain, $n(t)=H(z)\,w(t)$, or in the frequency domain, $n(t)=IFFT(H(f)*W(f))$, where $H(z)$ and $H(f)$ are the representation of the spectral shaping in the time and frequency domain, respectively, and $w(t)$ and $W(f)$ are suitable driving noise sequence, e.g. a pseudo noise signal.

However, when applying comfort noise generation to stereo signals or other multi-channel audio signals, the result is often not satisfactory. In fact, listeners may experience unpleasant effects.

SUMMARY

It would be desirable to achieve high quality comfort noise for multiple audio channels. The herein disclosed solution relates to a procedure for generating comfort noise, which replicates the spatial characteristics of background noise in addition to the commonly used spectral characteristics.

According to a first aspect, a method is provided, which is to be performed by an arrangement. The method comprising determining spectral characteristics of audio signals on at least two input audio channels. The method further comprises determining a spatial coherence between the audio signals on the respective input audio channels; and generating comfort noise, for at least two output audio channels, based on the determined spectral characteristics and spatial coherence.

According to a second aspect, a method is provided, which is to be performed by a transmitting node. The method comprising determining spectral characteristics of audio signals on at least two input audio channels. The method further comprises determining a spatial coherence between the audio signals on the respective input audio channels; and signaling information about the spectral characteristics of the audio signals on the at least two input audio channels and information about the spatial coherence between the audio signals on the input audio channels, to a receiving node, for generation of comfort noise for at least two audio channels at the receiving node.

According to a third aspect, a method is provided, which is to be performed by a receiving node. The method comprising obtaining information about spectral characteristics of input audio signals on at least two audio channels. The method further comprises obtaining information on a spatial coherence between the input audio signals on the at least two audio channels. The method further comprises generating comfort noise for at least two output audio channels, based on the obtained information about spectral characteristics and spatial coherence.

According to a fourth aspect, an arrangement is provided, which comprises at least one processor and at least one memory. The at least one memory contains instructions which are executable by said at least one processor. By the execution of the instructions, the arrangement is operative to determine spectral characteristics of audio signals on at least two input audio channels; to determine a spatial coherence between the audio signals on the respective input audio channels; and further to generate comfort noise for at least two output audio channels, based on the determined spectral characteristics and spatial coherence.

According to a fifth aspect, a transmitting node is provided. The transmitting node comprises processing means, for example in form of a processor and a memory, wherein the memory contains instructions executable by the processor, whereby the transmitting node is operable to perform the method according to the second aspect. That is, the transmitting node is operative to determine the spectral characteristics of audio signals on at least two input audio channels and to signal information about the spectral characteristics of the audio signals on the at least two input audio channels. The memory further contains instructions executable by said processor whereby the transmitting node is further operative to determine the spatial coherence between the audio signals on the respective input audio channels; and to signal information about the spatial coherence between the audio signals on the respective input audio channels to a receiving node, for generation of comfort noise for at least two audio channels at the receiving node.

According to a sixth aspect, a receiving node is provided. The receiving node comprises processing means, for example in form of a processor and a memory, wherein the memory contains instructions executable by the processor, whereby the transmitting node is operable to perform the method according to the third aspect above. That is, the receiving node is operative to obtain spectral characteristics of audio signals on at least two input audio channels. The receiving node is further operative to obtain a spatial coherence between the audio signals on the respective input audio channels; and to generate comfort noise, for at least two output audio channels, based on the obtained information about spectral characteristics and spatial coherence.

According to a seventh aspect, a user equipment is provided, which is or comprises an arrangement, a transmitting node or a receiving node according to one of the aspects above.

According to further aspects, computer programs are provided, which when run in an arrangement or node of the above aspects causes the arrangement or node to perform the method of the corresponding aspect above. Further, carriers carrying the computer programs are provided.

The solution according to the above described aspects enables generation of high-quality comfort noise for multiple channels.

BRIEF DESCRIPTION OF THE DRAWINGS

The foregoing and other objects, features, and advantages of the solution disclosed herein will be apparent from the following more particular description of embodiments as illustrated in the accompanying drawings. The drawings are not necessarily to scale, emphasis instead being placed upon illustrating the principles of the solution disclosed herein.

DETAILED DESCRIPTION

Figure 1:
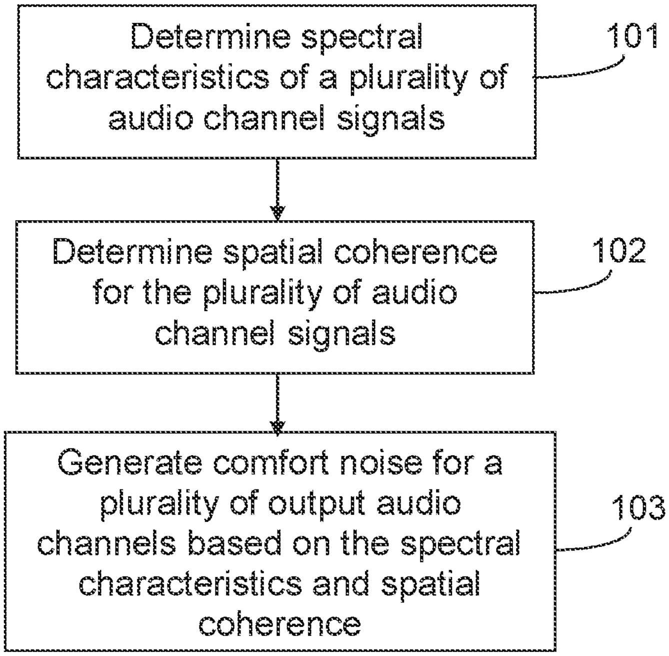
FIG. 1 is a flow chart of a method performed by an arrangement, according to an exemplifying embodiment.

A straight forward way of generating Comfort Noise, CN, for multiple channels, e.g. stereo, is to generate CN based on one of the audio channels. That is, derive the spectral characteristics of the audio signal on said channel and control a spectral filter to form the CN from a pseudo noise signal which is output on multiple channels, i.e. apply the CN from one channel to all the audio channels. However, if striving for a more realistic stereo noise, another straight forward way is to derive the spectral characteristics of the audio signals on all channels and use multiple spectral filters and multiple pseudo noise signals, one for each channel, and thus generating as many CNs as there are output channels. However, even though it could be expected that the latter method would replicate background noise in stereo with a good result, this is not always the case. Listeners which are subjected to this type of CN often experience that there is something strange or annoying with the sound. For example, listeners may have the experience that the noise source is located within their head, which may be very unpleasant.

The inventor has realized this problem and found a solution, which is described in detail below. The inventor has realized that, in order to improve the multi channel CN, also the spatial characteristics of the audio signals on the multiple audio channels should be taken into consideration when generating the CN. However, it is not obvious how to achieve this. The inventor have solved the problem by finding a way to determine, or estimate, the spatial coherence of the input audio signals, and then configuring the generation of CN signals such that these CN signals have a spatial coherence matching that of the input audio signals. It should be noted, that even when having identified that the spatial coherence could be used, it is not a simple task to achieve this. For simplicity, the solution described below is described for two audio channels, also denoted "left" and "right", or "x" and "y", i.e. stereo. However, the concept could be generalized to more than two channels.

The spatial coherence of the background noise can be obtained using the coherence function C(f)=|S_xy(f)|^2/(S_x(f)*S_y(f)) where S_x(f) is the averaged spectrum of the left channel signal, S_y(f) is the averaged spectrum of the right channel signal, and S_xy(f) is the cross-spectrum of the left and right channel signals. These spectra can e.g. be estimated by means of the periodogram using the fast Fourier transform (FFT).

Similarly, the CN spectral shaping filters can be obtained as a function of the square root of the signal spectra S_x(f) and S_y(f). Other technologies, e.g. AR modeling, may also be employed in order to estimate the CN spectral shaping filters.

A spatially and spectrally correlated CN may be obtained as $$\text{n\_l}(t) = \mathit{ifft}(\text{H\_1}(f) * (\text{W\_1}(f) + G(f) * \text{W\_2}(f)))$$

$$\text{n\_r}(t) = \mathit{ifft}(\text{H\_2}(f) * (\text{W\_2}(f) + G(f) * \text{W\_1}(f)))$$

where H_1(f) and H_2 (f) are spectral weighting functions obtained as a function of the signal spectra S_x(f) and S_y(f), G(f) is a function of the coherence function C(f), and W_1(f) and W_2(f) are pseudo random phase/noise components.

The estimation of the spatial and spectral background noise characteristics,

Cm(f): Spatial coherence

H_l(f): Left channel spectral characteristics (sqrt(S_l(f))

H_r(f): Right channel spectral characteristics (sqrt(S_r(f))

may be obtained using the Fourier transform of the left, x, and right, y, channel signal during noise-only periods, as exemplified in the following pseudo-code:

```
X = fft(x, N_FFT);
M = abs(X(1:(N_FFT/2))).^2/2/L;
Sx = RHO*Sx + (1-RHO)*M;
M_l = sqrt(min(Sx, 2*M));
H_l = [M_l; M_l(end); flipud(M_l(2:end))];
Y = fft(y, N_FFT);
M = abs(Y(1:(N_FFT/2))).^2/2/L;
Sy = RHO*Sy + (1-RHO)*M;
M_r = sqrt(min(Sy, 2*M));
H_r = [M_r; M_r(end); flipud(M_r(2:end))];
crossCorr = RHO*crossCorr + (1-RHO)*x'*y)^2/
    (x'*x)/(y'*y);
Sxy = RHO*Sxy + (1-RHO)*
(X(1:(N_FFT/2))).*conj(Y(1:(N_FFT/2)))/2/L;
C = (abs(Sxy).^2)./(eps+Sx.*Sy);
Cm = (31/32)*Cm + (1/32)*C;
```

The spatially and spectrally correlated comfort noise may then be reproduced using the inverse Fourier transform of a sum of frequency weighted noise sequences as outlined in the following.

The spectral representation of the comfort noise may be formulated as, for the left and right channel, respectively:

$$N\_l(f) = H\_1(f) * (W\_1(f) + G(f) * W\_2(f))$$

$$N\_r(f) = H\_2(f) * (W\_2(f) + G(f) * W\_1(f))$$

where W_1(f) and W_2(f) are preferably random noise sequences with unite magnitude represented in the frequency domain. Under the assumption that W_1(f) and W_2(f) are independent pseudo white sequences with unit magnitude, the coherence function of N_l(f) and N_r(f) equals (omitting the parameter f)

$$C\_N(f) = (|H\_1|^2 * |H\_2|^2 * |2 * G|^2) / (|H\_1|^2 * |H\_2|^2 * (1 + G^2)^2 = 4G^2/(1 + G^2)^2$$

Thus, to obtain a similar spatial coherence of the comfort noise as of the original stereo signal, i.e. that C_N(f)=C(f); G(f) may be derived from the identity C(f)=4 G(f)^2/(1+G (f)^2)^2 as $$G(f) = sqrt(2 - C(f) - sqrt((2 - C(f))^2 - C(f)))$$

The spectral matching is obtained by noting that the spectrum of N_l(f) and N_r(f) should equal S_N_l(f)=|H_1 (f)|^2*(1+G(f)^2) and S_N_r(f)=|H_2 (f)|^2*(1+G(f)^2). From this, H_1(f) and H_2(f) can be chosen so that S_N_l(f) and S_N_r(f) matches the spectrum of the original background noise in the left and right channel, |H_l(f)|^2 and |H_r(f)|^2, respectively, as $$H\_1(f) = H\_l(f) / sqrt(1 + G(f)^2)$$

$$H\_2(f) = H\_r(f) / sqrt(1 + G(f)^2)$$

In order to reduce complexity, it may be noted that the coherence of noise signals is usually only significant for low frequencies, hence, the frequency range for which calculations are to be performed may be reduced. That is, calculations may be performed only for a frequency range, e.g. where the spatial coherence C(f) exceeds a threshold, e.g. 0.2.

A simplified procedure may use only the correlation of the background noise in the left and right channel, g, instead of the coherence function C(f) above. The simplified version of only using the correlation of the background noise from the left and right channel may be implemented by replacing G(f) in the expression for H_1(f) and H_2 (f) with a scalar computed similar as G(f) but with the scalar correlation factor instead of the coherence function C(f).

The procedure may be implemented as described in the following pseudo-code:

```
seed = exp(i*2*pi*rand(N_FFT/2−1, 1));
W_1 = [rand(1); seed; rand(1); conj(flipud(seed))];
seed = exp(i*2*pi*rand(N_FFT/2−1, 1));
W_2 = [rand(1) ; seed; rand(1); conj(flipud(seed))];
if (useCoherence)
    Gamma = (1 − 2./Cm);
    Gamma = −Gamma − sqrt(Gamma.^2 − Cm);
    Gamma = sqrt(Gamma);
    G = [Gamma; Gamma(end); flipud(Gamma(2:end))];
    CrossCorr(frame) = mean(Cm);
    H_1 = H_l./sqrt(1+G.^2);
    H_2 = H_r./sqrt(1+G.^2);
    N_l = H_1.*(W_1 + G.*W_2);
    N_r = H_2.*(W_2 + G.*W_1);
else
    if (useCorrelation)
        gamma = (1 − 2/crossCorr);
        gamma = −gamma − sqrt(gamma^2 − crossCorr);
        gamma = sqrt(gamma);
    else
        gamma = 0;
    end
    H_1 = H_l/sqrt(1+gamma^2);
    H_2 = H_r/sqrt(1+gamma^2);
    N_l = H_1.*(W_1 + gamma*W_2);
    N_r = H_2.*(W_2 + gamma*W_1);
end
n_l = sqrt(N_FFT)*ifft(N_l);
n_r = sqrt(N_FFT)*ifft(N_r);
n_l = n_l(1:(L+N_overlap));
n_r = n_r(1:(L+N_overlap));
noise(ind, 1) =
[overlapWindow.*n_l(1:N_overlap)+overlap_l;
        n_l((N_overlap+1):L)];
overlap_l = flipud(overlapWindow).*n_l((L+1):end);
noise(ind, 2) =
[overlapWindow.*n_r(1:N_overlap)+overlap_r;
        n_r((N_overlap+1):L)];
overlap_r = flipud(overlapWindow).*n_r((L+1):end);
```

In the description above, the comfort noise is generated in the frequency domain, but the method may be implemented using time domain filter representations of the spectral and spatial shaping filters.

For residual echo control, the resulting comfort noise may be utilized in a frequency domain selective NLP which only blocks certain frequencies, by a subsequent spectral weighting.

For speech coding application, several technologies for the CN generator to obtain the spectral and spatial weighting may be used, and the Invention can be used independent of these technologies. Possible technologies include, but are not limited to, e.g. the transmission of AR parameters representing the background noise at regular time intervals or continuously estimating the background noise during regular speech transmission. Similarly, the spatial coherence may be modelled using e.g. a sinc function and transmitted at regular intervals, or continuously estimated during speech.

In the following paragraphs, different aspects of the solution disclosed herein will be described in more detail with references to certain embodiments and to accompanying drawings. For purposes of explanation and not limitation, specific details are set forth, such as particular scenarios and techniques, in order to provide a thorough understanding of the different embodiments. However, other embodiments may depart from these specific details.

Exemplifying Method Performed by an Arrangement, FIG. 1

An exemplifying method for CN generation performed by an arrangement in a device or system will be described below with reference to FIG. 1. The arrangement should be assumed to have technical character. The method is suitable for generation of comfort noise for a plurality of audio channels, i.e. at least two audio channels. The arrangement may be of different types. It can comprise an echo canceller located in a network node or a device, or, it can comprise a transmitting node and a receiving node operable to encode and decode audio signals, and to apply silence suppression or a DTX scheme during periods of relative silence, e.g. non-active speech.

FIG. 1 illustrates the method comprising determining 101 the spectral characteristics of audio signals on at least two input audio channels. The method further comprises determining 102 the spatial coherence between the audio signals on the respective input audio channels; and generating 103 comfort noise, for at least two output audio channels, based on the determined spectral characteristics and spatial coherence.

The arrangement is assumed to have received the plurality of input audio signals on the plurality of audio channels e.g. via one or more microphones or from some source of multi-channel audio, such as an audio file storage. The audio signal on each audio channel is analyzed in respect of its frequency contents, and the spectral characteristics, denoted e.g. H_l(f) and H_r(f) are determined according to a therefore suitable method. This is what has been done in prior art methods for comfort noise generation. These spectral characteristics could also be referred to as the spectral characteristics of the channel, in the sense that a channel having the spectral characteristics H_l(f) would generate the audio signal I(t) from e.g. white noise. That is, the spectral characteristics are regarded as a spectral shaping filter. It should be noted that these spectral characteristics do not comprise any information related to any cross-correlation between the input audio signals or channels.

However, here, yet another characteristic of the audio signals is determined, namely a relation between the input audio signals in form of the spatial coherence C between the input audio signals. In general, the concept of coherence is related to the stability, or predictability, of phase. Spatial coherence describes the correlation between signals at different points in space, and is often presented as a function of correlation versus absolute distance between observation points.

Figure 2:
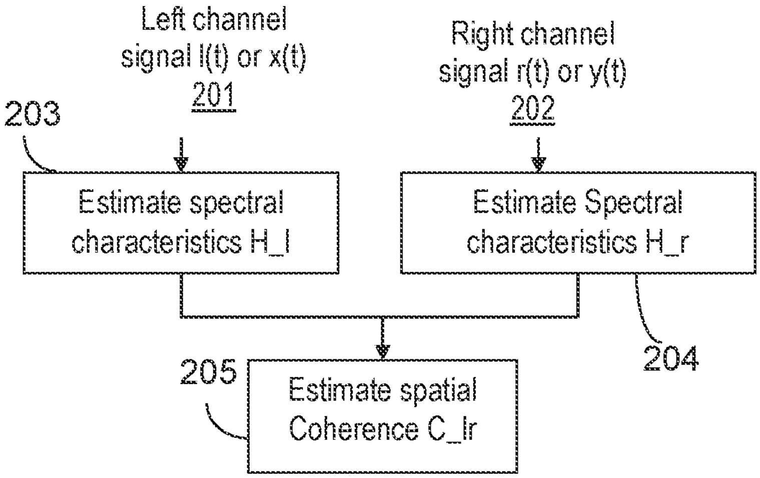
FIG. 2 is a flow chart of a method performed by an arrangement and/or a transmitting node, according to an exemplifying embodiment.

In an example with two input audio signals, I(t) and r(t), where "I" stands for "left" and "r" stands for "right", these audio signals are input to the arrangement, e.g. via a stereo microphone. These signals could alternatively be denoted x(t) and y(t), which is used in a previous part of the description. FIG. 2 is a schematic illustration of a process, showing both actions and signals, where the two input signals can be seen as left channel signal 201 and right channel signal 202. The left channel spectral characteristics, expressed as H_l(f), are estimated 203, and the right channel spectral characteristics, H_r(f), are estimated 204. This could, as previously described, be performed using Fourier analysis of the input audio signals. Then, the spatial coherence C_lr is estimated 205 based on the input audio signals and possibly reusing results from the estimation 203 and 204 of spectral characteristics of the respective input audio signals.

Figure 3:
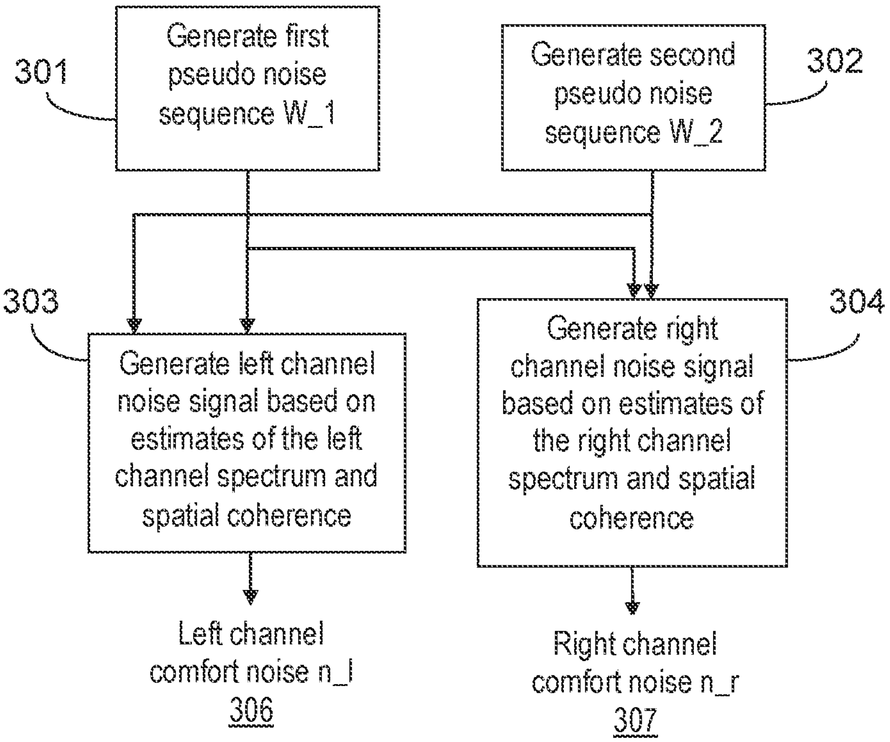
FIG. 3 is a flow chart of a method performed by an arrangement and/or a receiving node, according to an exemplifying embodiment.

The generation of comfort noise is illustrated in an exemplifying manner in FIG. 3, showing both actions and signals. A first, W_1, and a second, W_2, pseudo noise sequence are generated in 301 and 302, respectively. Then, a left channel noise signal is generated 303 based on the estimates of the left channel spectral characteristics H_l and the spatial coherence C_lr; and based on the generated pseudo noise sequences W_1 and W_2. Further, a right channel noise signal is generated 304 based on the estimated right channel spectral characteristics H_l and spatial coherence C_lr, and the pseudo noise sequences W_1 and W_2. More details on how this is done have been previously described, and will be further described below.

When the arrangement is of echo canceller type, the determining of spectral and spatial information and the generation of comfort noise is performed in the same entity, which could be an NLP. In that case, the spectral and spatial information is not necessarily signaled to another entity or node, but only processed within the echo canceller. The echo canceller could be part of/located in e.g. devices, such as smartphones; mixers and different types of network nodes.

Figure 4:
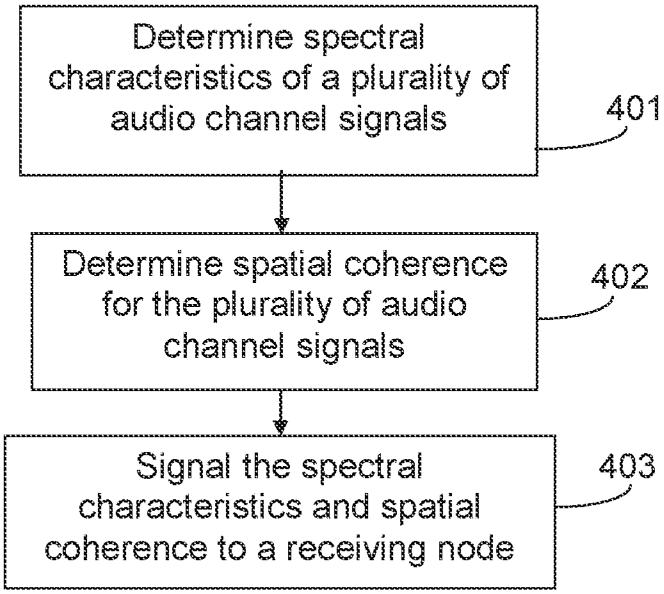
FIG. 4 is a flow chart of a method performed by a transmitting node, according to an exemplifying embodiment.

Exemplifying Method Performed by a Transmitting Node, FIG. 4

An exemplifying method, performed by a transmitting node, for supporting generation of comfort noise, will be described below with reference to FIG. 4. The transmitting node, which could alternatively be denoted e.g. encoding node, should be assumed to have technical character. The method is suitable for supporting generation of comfort noise for a plurality of audio channels, i.e. at least two audio channels. The transmitting node is operable to encode audio signals, and to apply silence suppression or a DTX scheme during periods of relative silence, e.g. periods of non-active speech. The transmitting node may be a wireless and/or wired device, such as a user equipment, UE, a tablet, a computer, or any network node receiving or otherwise obtaining audio signals to be encoded. The transmitting node may be part of the arrangement described above.

FIG. 4 illustrates the method comprising determining 401 the spectral characteristics of audio signals on at least two input audio channels. The method further comprises determining 402 the spatial coherence between the audio signals on the respective input audio channels; and signaling 403 information about the spectral characteristics of the audio signals on the at least two input audio channels and information about the spatial coherence between the audio signals on the input audio channels, to a receiving node, for generation of comfort noise for at least two audio channels at the receiving node.

In an example case with two input audio signals, i.e. stereo, the procedure of determining the spectral characteristics and spatial coherence may correspond to the one illustrated in FIG. 2, which is also described above.

The signaling of information about the spectral characteristics and spatial coherence may comprise an explicit transmission of these characteristics, e.g. H_l, H_r, and C_lr, or, it may comprise transmitting or conveying some other representation or indication, implicit or explicit, from which the spectral characteristics of the input audio signals and the spatial coherence between the input audio signals could be derived.

The spatial coherence may be determined by applying a coherence function on a representation of the audio signals on the at least two input audio channels. For example, the spatial coherence $C_{xy}$ between two signals, x and y of the at least two input audio signals, could be determined as: $C_{xy}=|S_{xy}|^2/(S_{xx}{}^2*S_{yy}{}^2)$; where $S_{xy}$ is the cross-spectral density between x and y, and $S_{xx}$ and $S_{yy}$ is the autospectral density of x and y respectively.

In a stereo example, when denoting the input signals "I" and "r", this would be denoted $C\_lr=|S_{lr}|^2/(S_{ll}{}^2*S_{rr}{}^2)$, or $C\_lr=|S_{lr}|^2/(S_l{}^2*S_r{}^2)$. It should be noted that $S_x \approx |H\_x|^2$. Thus, when having determined the spectral characteristics H for each audio signal, or channel, and the spatial coherence C between the channels, these parameters should be signaled to a receiving node. In the case of applying the solution in an echo canceller, as described above, the determined parameters are used to generate comfort noise within the same entity.

In a simplified implementation, the coherence C(f) could be estimated, i.e. approximated, with the cross-correlation of/between the audio signals on the respective input audio channels. This would be a scalar correlation factor, i.e. a constant value, which could be derived by integrating the coherence function C(f) over a frequency range. This would still give a better result than when not using any spatial coherence information.

The input audio signals are "real" audio signals, from which the spectral characteristics and spatial coherence could be derived or determined in the manner described herein. This information should then be used for generating comfort noise, i.e. a synthesized noise signal which is to imitate or replicate the background noise on the input audio channels.

Figure 5:
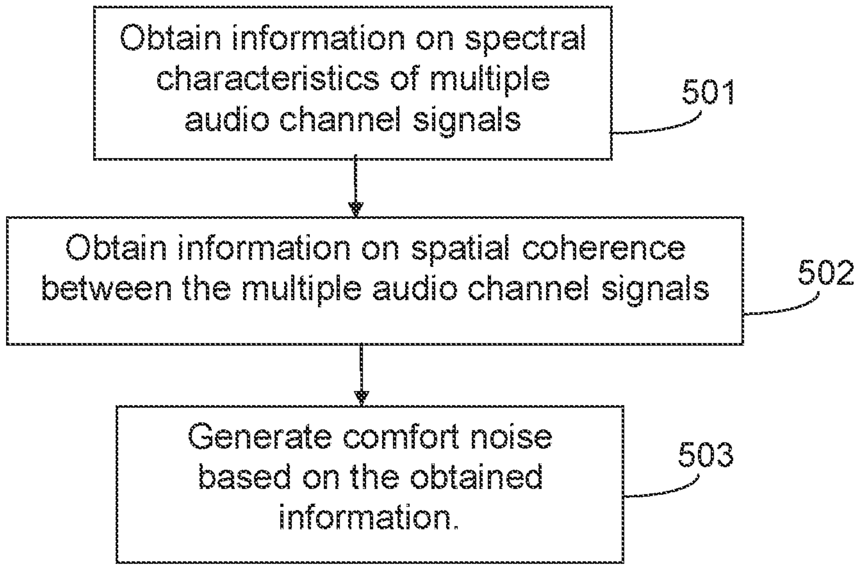
FIG. 5 is a flow chart of a method performed by an arrangement and/or a receiving node, according to an exemplifying embodiment.

Exemplifying Method Performed by a Receiving Node, FIG. 5

An exemplifying method, for generating comfort noise, performed by a receiving node, e.g. device or other technical entity, will be described below with reference to FIG. 5. The receiving node should be assumed to have technical character. The method is suitable for generation of comfort noise for a plurality of audio channels, i.e. at least two audio channels.

Figure 7:
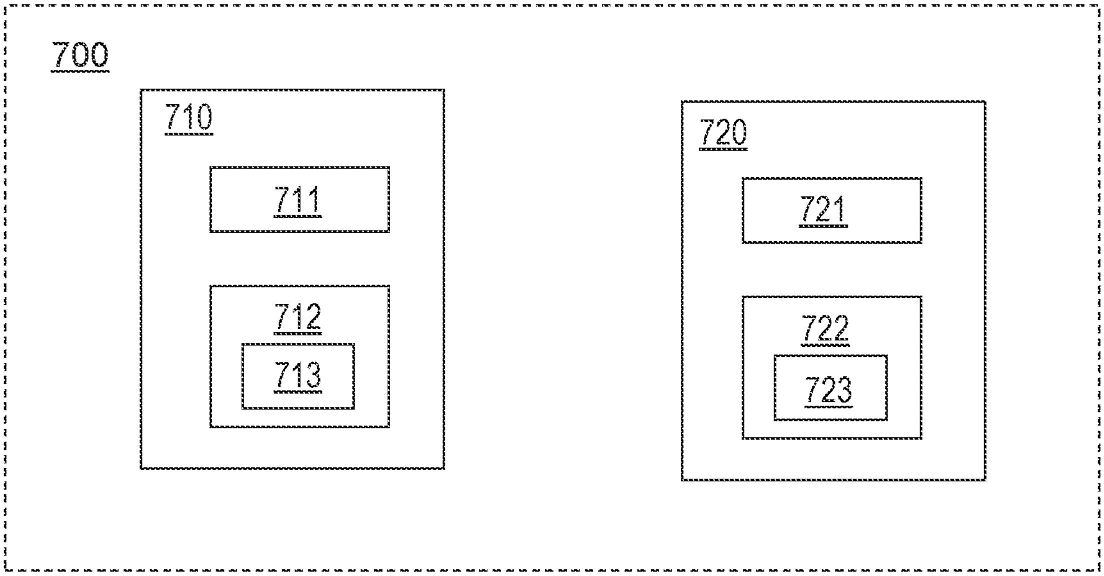

FIG. 7 illustrates the method comprising obtaining 501 information about spectral characteristics of input audio signals on at least two audio channels. The method further comprises obtaining 502 information on spatial coherence between the input audio signals on the at least two audio channels. The method further comprises generating comfort noise for at least two output audio channels, based on the obtained information about spectral characteristics and spatial coherence.

The obtaining of information could comprise either receiving the information from a transmitting node, or determining the information based on audio signals, depending on which type of entity that is referred to, in terms of echo canceller or decoding node, which will be further described below. The obtained information corresponds to the information determined or estimated as described above in conjunction with the methods performed by an arrangement or by a transmitting node. The obtained information about the spectral characteristics and spatial coherence may comprise the explicit parameters, e.g. for stereo: H_l, H_r, and C_lr, or, it may comprise some other representation or indication, implicit or explicit, from which the spectral characteristics of the input audio signals and the spatial coherence between the input audio signals could be derived.

The generating of comfort noise comprises generating comfort noise signals for each of the at least two output audio channels, where the comfort noise has spectral characteristics corresponding to those of the input audio signals, and a spatial coherence which corresponds to that of the input audio signals. How this may be done in detail has been described above and will be described further below.

The generation of a comfort noise signal N_1 for an output audio channel may comprise determining a spectral shaping function H_1, based on the information on spectral characteristics of one of the input audio signals and the spatial coherence between the input audio signal and at least another input audio signal. The generation may further comprise applying the spectral shaping function H_1 to a first random noise signal W_1 and to a second random noise signal W_2(f), where W_2(f) is weighted G(f) based on the coherence between the input audio signal and the at least another input audio signal.

In the stereo example, the comfort noise signal N_l(f) for the left output audio channel may be derived as N_l(f)=H_1 (f)*(W_1(f)+G(f)*W_2 (f)), where G(f) is derived as G(f)= sqrt(2−C_lr(f)−sqrt((2−C_lr(f))^2−C_lr(f))), and H_1(f) is derived as H_1(f)=H_l(f)/sqrt(1+G(f)^2). This is also described further above in this description. As mentioned above and illustrated e.g. in FIG. 3, W_1(f) and W_2(f) denotes random noise signals, which are generated as base for the comfort noise. The random noise signals are shaped into the respective comfort noise signals by use of spectral shaping functions or filters and components representing a contribution from spatial coherence. That is, looking at the example for stereo, N_l(f)=H_1(f)*(W_1(f)+G(f)*W_2 (f)), e.g. G(f)W_2 (f) is related to spatial coherence.

Since the comfort noise is generated to replicate the background noise of the input audio signals, it is desired that the spatial coherence between the output comfort noise signals is as close as possible to the spatial coherence between the input audio signals. With input signals l and r, and output signals n_l and n_r, this corresponds to setting C_nlnr=C_lr.

When the receiving node refers to the decoder side of a codec, and could be denoted e.g. decoding node, the obtaining of information comprises receiving the information from a transmitting node as the one described above. This would be the case e.g. when encoded audio is transferred between two devices in a wireless communication system, via e.g. D2D (device-to-device) communication or cellular communication via a base station or other access point. During periods of DTX, comfort noise may be generated in the receiving node, instead of that the background noise at the transmitting node is encoded and transferred in its entirety. That is, in this case, the information is derived or determined from input audio signals in another node, and then signaled to the receiving node.

On the other hand, if the receiving node refers to a node comprising an echo canceller, which obtains the information and generates comfort noise, the obtaining of information comprises determining the information based on input audio signals on at least two audio channels. That is, the information is not derived or determined in another node and then transferred from the other node, but determined from a representation of the "real" input audio signals. The input audio signals may in that case be obtained via e.g. one or more microphones, or from a storage of multi channel audio files or data.

At least when "receiving node" refers to a decoder side node, the receiving node is operable to decode audio, such as speech, and to communicate with other nodes or entities, e.g. in a communication network. The receiving node is further operable to apply silence suppression or a DTX scheme comprising e.g. transmission of SID (Silence Insertion Descriptor) frames during speech inactivity. The receiving node may be e.g. a cell phone, a UE, a tablet, a computer or any other device capable of wired and/or wireless communication and of decoding of audio.

Figure 6:
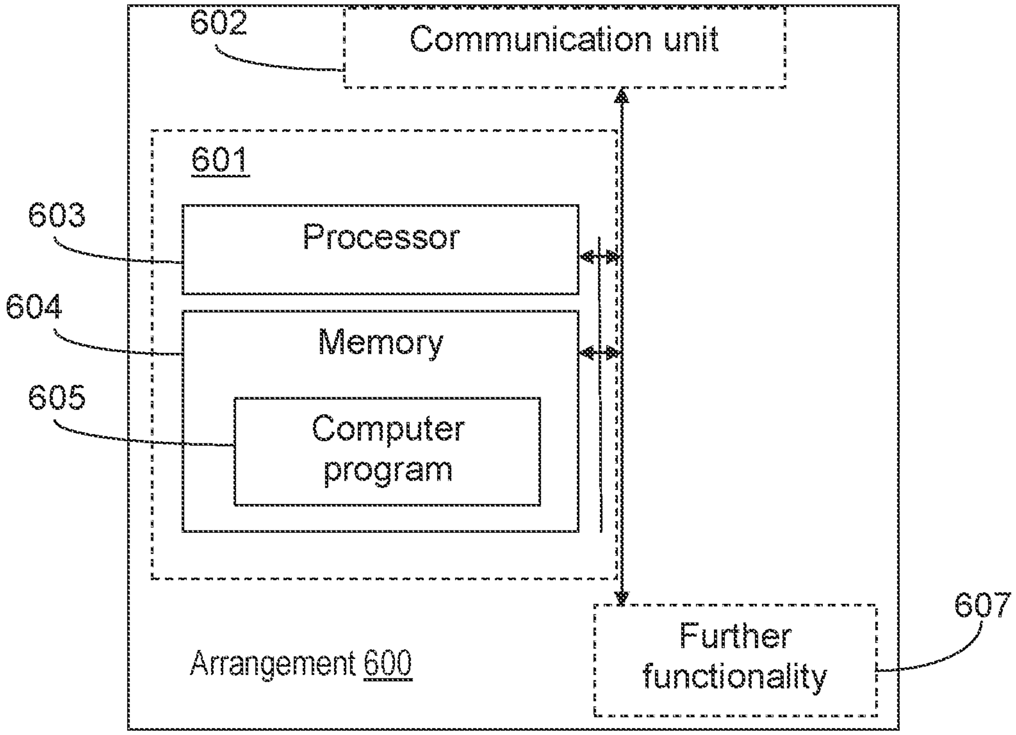
FIGS. 6 and 7 illustrate arrangements according to exemplifying embodiments.

Exemplifying Arrangements, FIGS. 6 and 7

Embodiments described herein also relate to an arrangement. The arrangement could comprise one entity, as illustrated in FIG. 6; or two entities, as illustrated in FIG. 7. The one-entity arrangement 600 is illustrated to represent a solution related to e.g. an echo canceller, which both determines the spectral and spatial characteristics of input audio signals, and generates comfort noise base on these determined characteristics for a plurality of output channels. The arrangement 600 could be or comprise a receiving node as described below having an echo canceller function.

The two-entity arrangement 700 is illustrated to represent a coding/decoding unit solution; where the determining of spectral and spatial characteristics is performed in one entity or node 710, and then signaled to another entity or node 720, where the comfort noise is generated. The entity 710 could be a transmitting node, as described below; and the entity 720 could be a receiving node as described below having a decoder side function.

The arrangement comprises at least one processor 603, 711, 712, and at least one memory 604, 712, 722, where said at least one memory contains instructions 605, 713, 714 executable by said at least one processor. By the execution of the instructions, the arrangement is operative to determine the spectral characteristics of audio signals on at least two input audio channels; to determine the spatial coherence between the audio signals on the respective input audio channels; and further to generate comfort noise for at least two output audio channels, based on the determined spectral characteristics and spatial coherence.

Figure 8:
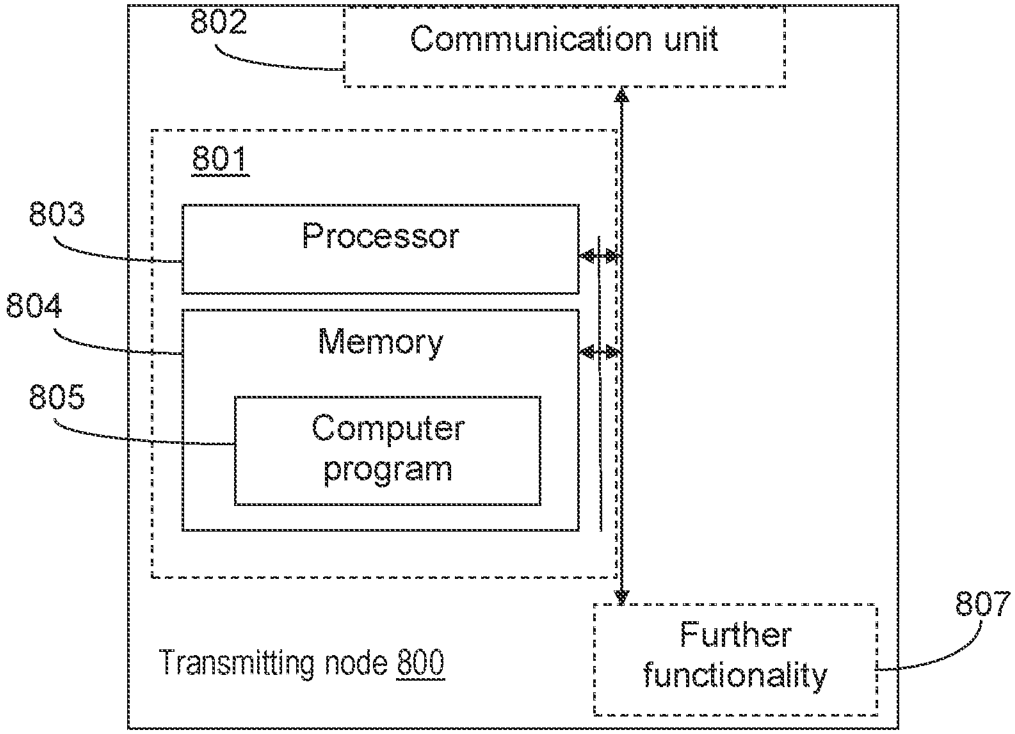
FIGS. 8 and 9 illustrate transmitting nodes according to exemplifying embodiments.

Exemplifying Transmitting Node, FIG. 8

Embodiments described herein also relate to a transmitting node 800. The transmitting node is associated with the same technical features, objects and advantages as the method described above and illustrated e.g. in FIGS. 2 and 4. The transmitting node will be described in brief in order to avoid unnecessary repetition. The transmitting node 800 could be e.g. a user equipment UE, such as an LTE UE, a communication device, a tablet, a computer or any other device capable of wireless and/or wired communication. The transmitting node may be operable to communicate in one or more wireless communication systems, such as UMTS, E-UTRAN or CDMA 2000. and/or over one or more types of short range communication networks.

Below, an exemplifying transmitting node 800, adapted to enable the performance of an above described method performed by a transmitting node, will be described with reference to FIG. 8.

The transmitting node is operable to apply silence suppression or a DTX scheme, and is operable to communicate with other nodes or entities in a communication network.

The part of the transmitting node which is mostly related to the herein suggested solution is illustrated as a group 801 surrounded by a broken/dashed line. The group 801 and possibly other parts of the transmitting node is adapted to enable the performance of one or more of the methods or procedures described above and illustrated e.g. in FIG. 4. The transmitting node may comprise a communication unit 802 for communicating with other nodes and entities, and may comprise further functionality 807 useful for the transmitting node 110 to serve its purpose as communication node. These units are illustrated with a dashed line.

The transmitting node illustrated in FIG. 8 comprises processing means, in this example in form of a processor 803 and a memory 804, wherein said memory is containing instructions 805 executable by said processor, whereby the transmitting node is operable to perform the method described above. That is, the transmitting node is operative to determine the spectral characteristics of audio signals on at least two input audio channels and to signal information about the spectral characteristics of the audio signals on the at least two input audio channels. The memory 804 further contains instructions executable by said processor whereby the transmitting node is further operative to determine the spatial coherence between the audio signals on the respective input audio channels; and to signal information about the spatial coherence between the audio signals on the respective input audio channels to a receiving node, for generation of comfort noise for at least two audio channels at the receiving node.

As previously mentioned, the spatial coherence may be determined by applying a coherence function on a representation of the audio signals on the at least two input audio channels. Further, the spatial coherence $C_{xy}$ between two signals, x and y, of the at least two signals, may be determined as: $C_{xy}=|S_{xy}|^2/(S_{xx}{}^2*S_{yy}{}^2)$; where $S_{xy}$ is the cross-spectral density between x and y, and $S_{xx}$ and $S_{yy}$ is the autospectral density of x and y respectively. The coherence may be approximated as a cross-correlation between the audio signals on the respective input audio channels.

The computer program 805 may be carried by a computer readable storage medium connectable to the processor. The computer program product may be the memory 804. The computer readable storage medium, e.g. memory 804, may be realized as for example a RAM (Random-access memory), ROM (Read-Only Memory) or an EEPROM (Electrical Erasable Programmable ROM). Further, the computer program may be carried by a separate computer-readable medium, such as a CD, DVD, USB or flash memory, from which the program could be downloaded into the memory 804. Alternatively, the computer program may be stored on a server or another entity connected to a communication network to which the transmitting node has access, e.g. via the communication unit 802. The computer program may then be downloaded from the server into the memory 804. The computer program could further be carried by a non-tangible carrier, such as an electronic signal, an optical signal or a radio signal.

The group 801, and other parts of the transmitting node, could be implemented e.g. by one or more of: a processor or a micro processor and adequate software and storage therefore, a Programmable Logic Device, PLD, or other electronic component(s)/processing circuit(s) configured to perform the actions mentioned above. Although the instructions described in the embodiments disclosed above are implemented as a computer program 805 to be executed by the processor 803, at least one of the instructions may in alternative embodiments be implemented at least partly as hardware circuits.

Figure 9:
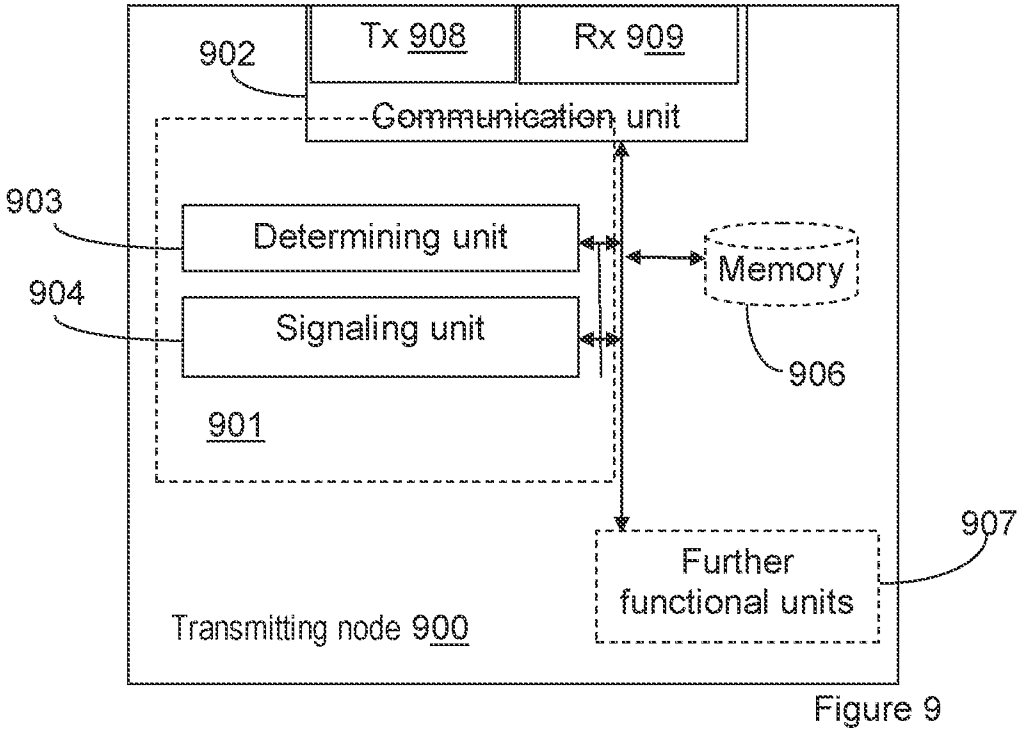

The group 801 may alternatively be implemented and/or schematically described as illustrated in FIG. 9. The group 901 comprises a determining unit 903, for determining the spectral characteristics of audio signals on at least two input audio channels, and for determining the spatial coherence between the audio signals on the respective input audio channels. The group further comprises a signaling unit 904 for signaling information about the spectral characteristics of the audio signals on the at least two input audio channels, and for signaling information about the spatial coherence between the audio signals on the respective input audio channels to a receiving node, for generation of comfort noise for at least two audio channels at the receiving node The transmitting node 900 could be e.g. a user equipment UE, such as an LTE UE, a communication device, a tablet, a computer or any other device capable of wireless communication. The transmitting node may be operable to communicate in one or more wireless communication systems, such as UMTS, E-UTRAN or CDMA 2000. and/or over one or more types of short range communication networks.

The spatial coherence may be determined, by the transmitting node 900, by applying a coherence function on a representation of the audio signals on the at least two input audio channels. Further, the spatial coherence $C_{xy}$ between two signals, x and y, of the at least two signals, may be determined as: $C_{xy}=|S_{xy}|^2/(S_{xx}^2*S_{yy}^2)$; where $S_{xy}$ is the cross-spectral density between x and y, and $S_{xx}$ and $S_{yy}$ is the autospectral density of x and y respectively. The coherence may be approximated as a cross-correlation between the audio signals on the respective input audio channels.

The group 901, and other parts of the transmitting node could be implemented e.g. by one or more of: a processor or a micro processor and adequate software and storage therefore, a Programmable Logic Device, PLD, or other electronic component(s)/processing circuit(s) configured to perform the actions mentioned above.

The transmitting node 900, illustrated in FIG. 9, may further comprise a communication unit 902 for communicating with other entities, one or more memories 907 e.g. for storing of information and further functionality 908, such as signal processing and/or user interaction.

Figure 10:
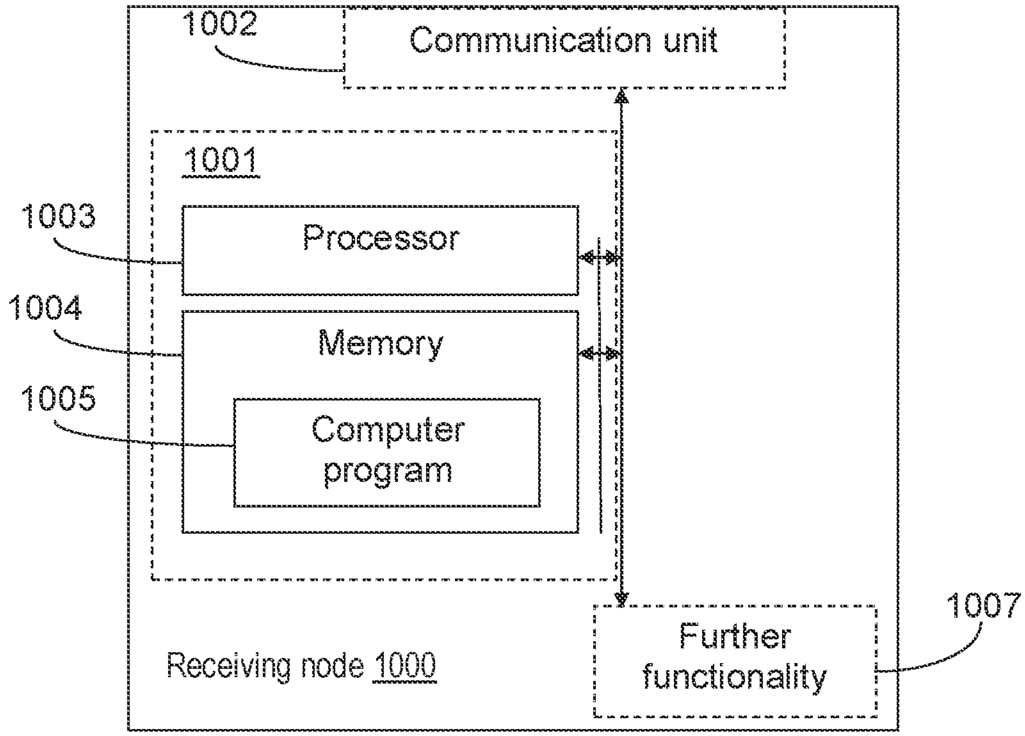
FIGS. 10 and 11 illustrate Receiving nodes according to exemplifying embodiments.

Exemplifying Receiving Node, FIG. 10

Embodiments described herein also relate to a receiving node 1000. The receiving node is associated with the same technical features, objects and advantages as the method described above and illustrated e.g. in FIGS. 3 and 5. The receiving node will be described in brief in order to avoid unnecessary repetition. The receiving node 1000 could be e.g. a user equipment UE, such as an LTE UE, a communication device, a tablet, a computer or any other device capable of wireless communication. The receiving node may be operable to communicate in one or more wireless communication systems, such as UMTS, E-UTRAN or CDMA 2000 and/or over one or more types of short range communication networks.

The receiving node may be operable to apply silence suppression or a DTX scheme, and may be operable to communicate with other nodes or entities in a communication network; at least when the receiving node is described in a role as a decoding unit receiving spectral and spatial information from a transmitting node.

Below, an exemplifying receiving node 1000, adapted to enable the performance of an above described method performed by a receiving node, will be described with reference to FIG. 10.

The part of the receiving node which is mostly related to the herein suggested solution is illustrated as a group 1001 surrounded by a broken/dashed line. The group 1001 and possibly other parts of the receiving node is adapted to enable the performance of one or more of the methods or procedures described above and illustrated e.g. in FIG. 1, 3 or 5. The receiving node may comprise a communication unit 1002 for communicating with other nodes and entities, and may comprise further functionality 1007, such as further signal processing and/or communication and user interaction. These units are illustrated with a dashed line.

The receiving node illustrated in FIG. 10 comprises processing means, in this example in form of a processor 1003 and a memory 1004, wherein said memory is containing instructions 1005 executable by said processor, whereby the transmitting node is operable to perform the method described above. That is, the receiving node is operative to obtain, i.e. receive or determine, the spectral characteristics of audio signals on at least two input audio channels. The memory 1004 further contains instructions executable by said processor whereby the receiving node is further operative to obtain, i.e. receive or determine, the spatial coherence between the audio signals on the respective input audio channels; and to generate comfort noise, for at least two output audio channels, based on the obtained information about spectral characteristics and spatial coherence.

The generation of a comfort noise signal N_1 for an output audio channel may comprise determining a spectral shaping function H_1, based on the information on spectral characteristics of one of the input audio signals and the spatial coherence between the input audio signal and at least another input audio signal. The generation may further comprise applying the spectral shaping function H_1 to a first random noise signal W_1 and on a second random noise signal W_2(f), where W_2(f) is weighted based on the coherence between the input audio signal and the at least another input audio signal.

The obtaining of information may comprise receiving the information from a transmitting node. Alternatively, the receiving node may comprise an echo canceller, and the obtaining of information may then comprise determining the information based on input audio signals on at least two audio channels. That is, as described above, in case of the echo cancelling function, the determining of spectral and spatial characteristics are determined by the same entity, e.g. an NLP. In the latter case, the "receiving" in receiving node may be associated e.g. with the receiving of the at least two audio channel signals, e.g. via a microphone.

Figure 11:
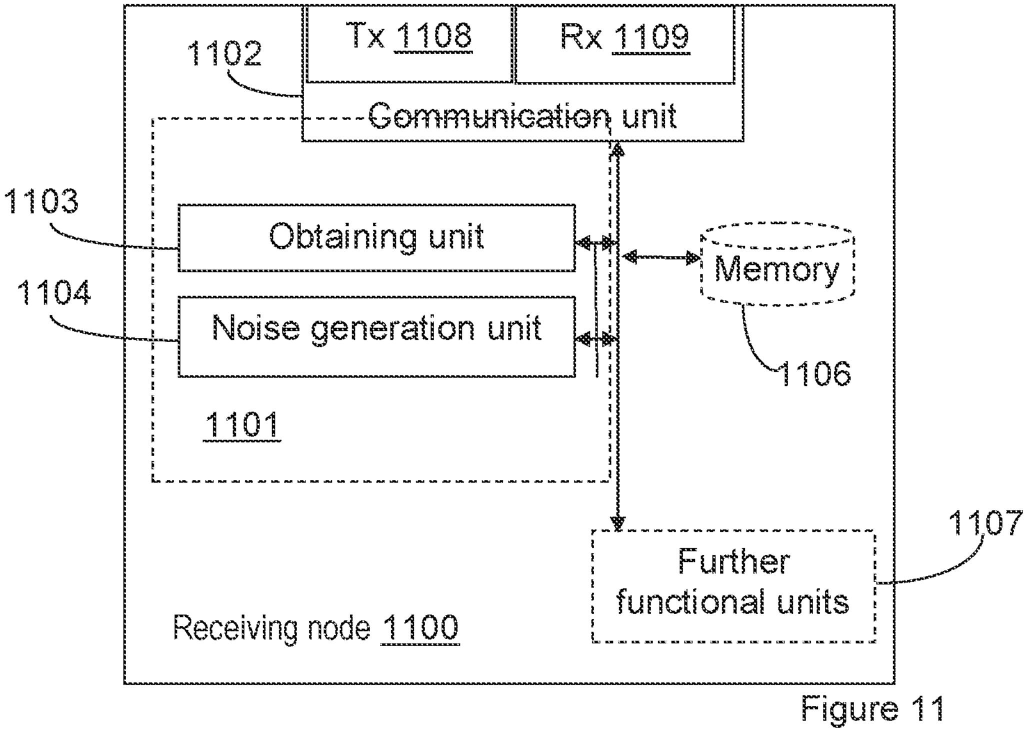

The group 1001 may alternatively be implemented and/or schematically described as illustrated in FIG. 11. The group 1101 comprises an obtaining unit 1103, for obtaining information about spectral characteristics of input audio signals on at least two audio channels; and for obtaining information about spatial coherence between the input audio signals on the at least two audio channels. The group 1101 further comprises a noise generation unit 1104 for generating comfort noise for at least two output audio channels, based on the obtained information about spectral characteristics and spatial coherence.

The receiving node 1100 could be e.g. a user equipment UE, such as an LTE UE, a communication device, a tablet, a computer or any other device capable of wireless and/or wired communication. The receiving node may be operable to communicate in one or more wireless communication systems, such as UMTS, E-UTRAN or CDMA 2000 and/or over one or more types of short range communication networks.

As for the receiving node 1000, the generation of a comfort noise signal N_1 for an output audio channel may comprise determining a spectral shaping function H_1, based on the information on spectral characteristics of one of the input audio signals and the spatial coherence between the input audio signal and at least another input audio signal. The generation may further comprise applying the spectral shaping function H_1 to a first random noise signal W_1 and on a second random noise signal W_2 (f), where W_2 (f) is weighted based on the coherence between the input audio signal and the at least another input audio signal.

The obtaining of information may comprise receiving the information from a transmitting node. Alternatively, the receiving node may comprise an echo canceller, and the obtaining of information may then comprise determining the information based on input audio signals on at least two audio channels.

The group 1101, and other parts of the receiving node could be implemented e.g. by one or more of: a processor or a micro processor and adequate software and storage therefore, a Programmable Logic Device, PLD, or other electronic component(s)/processing circuit(s) configured to perform the actions mentioned above.

The receiving node 1100, illustrated in FIG. 11, may further comprise a communication unit 1102 for communicating with other entities, one or more memories 1107 e.g. for storing of information and further functionality 1107, such as signal processing, and/or user interaction.

It is to be understood that the choice of interacting units or modules, as well as the naming of the units are only for exemplifying purpose, and arrangements, transmitting and receiving nodes suitable to execute any of the methods described above may be configured in a plurality of alternative ways in order to be able to execute the suggested process actions.

It should also be noted that the units or modules described in this disclosure are to be regarded as logical entities and not with necessity as separate physical entities.

All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the presently described concept, for it to be encompassed hereby.

The invention claimed is:

1. A method, performed by an encoder, for supporting generation of comfort noise for two audio channels at a decoder, the method comprising:

determining a spatial coherence between two audio signals on respective input audio channels; and signaling information about the spatial coherence between the audio signals to the decoder, for generation of comfort noise at the decoder.

2. The method according to claim 1, wherein the spatial coherence is determined by applying a coherence function on the audio signals on the two input audio channels.

3. The method according to claim 1, wherein the spatial coherence $C_{xy}$ between two signals, x and y, of the two audio signals, is determined as:

$$C_{xy} = |S_{xy}|^2 / (S_{xx}^2 * S_{yy}^2);$$

where $S_{xy}$ is the cross-spectral density between x and y, and $S_{xx}$ and $S_{yy}$ is the autospectral density of x and y respectively.

4. The method according to claim 1, wherein the coherence is approximated as a cross-correlation between the audio signals on the respective input audio channels.

5. An encoder, the encoder comprising at least one processor and a non-transitory memory containing instructions which, when executed by the at least one processor, cause the encoder to:

determine a spatial coherence between two audio signals on respective input audio channels; and signal information about the spatial coherence between the audio signals to a decoder, for generation of comfort noise at the decoder.

6. The encoder according to claim 5, wherein the spatial coherence is determined by applying a coherence function on the audio signals on the two input audio channels.

7. The encoder according to claim 5, wherein the spatial coherence $C_{xy}$ between two signals, x and y, of the two audio signals, is determined as:

$$C_{xy} = |S_{xy}|^2 / (S_{xx}^2 * S_{yy}^2);$$

where $S_{xy}$ is the cross-spectral density between x and y, and $S_{xx}$ and $S_{yy}$ is the autospectral density of x and y respectively.

8. The encoder according to claim 5, wherein the coherence is approximated as a cross-correlation between the audio signals on the respective input audio channels.

9. A user equipment (UE) comprising the encoder according to claim 5.

* * * * *